United States Patent
Wenstrup

(10) Patent No.: US 10,443,190 B2
(45) Date of Patent: Oct. 15, 2019

(54) FIRE RESISTANT COMPOSITE ROOFING MEMBRANE

(71) Applicant: Milliken & Company, Spartanburg, SC (US)

(72) Inventor: David E. Wenstrup, Greer, NC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 16/178,114

(22) Filed: Nov. 1, 2018

(65) Prior Publication Data

US 2019/0136447 A1    May 9, 2019

Related U.S. Application Data

(60) Provisional application No. 62/583,775, filed on Nov. 9, 2017.

(51) Int. Cl.
*D06N 5/00* (2006.01)
*E04D 5/10* (2006.01)
(Continued)

(52) U.S. Cl.
CPC .............. *D06N 5/00* (2013.01); *B32B 5/022* (2013.01); *B32B 5/024* (2013.01); *B32B 5/026* (2013.01);
(Continued)

(58) Field of Classification Search
CPC .............. D06N 5/00; D06N 2211/06; D06N 2203/048; D06N 2201/0245; D06N 2209/067; D06N 2201/082; B32B 5/022; B32B 27/32; B32B 27/304; B32B 27/12; B32B 25/16; B32B 25/10; B32B 7/12; B32B 5/026; B32B 5/024; B32B 2419/06; B32B 2307/732; B32B 2307/718; B32B 2307/54; B32B 2262/106; B32B 2262/101; B32B 2262/10; B32B 2262/04;
(Continued)

(56) References Cited

U.S. PATENT DOCUMENTS 4,230,753 A * 10/1980 Sheyon .................. C09J 7/0296
                                                      428/212
4,244,817 A *  1/1981 Yaginuma ............ B01D 69/125
                                                      210/500.33
(Continued)

FOREIGN PATENT DOCUMENTS

EP           3483353 A1 *  5/2019

*Primary Examiner* — Brent W Herring
(74) *Attorney, Agent, or Firm* — Cheryl J. Brickey

(57) ABSTRACT

A composite roofing membrane containing a single ply roofing membrane containing a first membrane, a scrim, and a second membrane. The first side of the first membrane forms the upper surface of the composite roofing membrane and contains a thermoplastic polymer. The scrim has a machine and cross-machine direction and contains a yarn or fiber selected from the group consisting of polyester and glass, and a tensile strength in the machine direction is at least about 100 N/cm². The second membrane contains a thermoplastic polymer. The composite roofing membrane also contains a fire resistant fleece containing a plurality of FR rayon staple fibers and a plurality of char scaffold fibers selected from the group consisting of partially oxidized acrylonitrile and silica staple fibers.

20 Claims, 1 Drawing Sheet

(51) Int. Cl.
  *E04B 1/94* (2006.01)
  *B32B 5/02* (2006.01)
  *B32B 7/12* (2006.01)
  *B32B 25/10* (2006.01)
  *B32B 25/16* (2006.01)
  *B32B 27/12* (2006.01)
  *B32B 27/30* (2006.01)
  *B32B 27/32* (2006.01)
  *E04D 5/14* (2006.01)

(52) U.S. Cl.
  CPC ............... *B32B 7/12* (2013.01); *B32B 25/10* (2013.01); *B32B 25/16* (2013.01); *B32B 27/12* (2013.01); *B32B 27/304* (2013.01); *B32B 27/32* (2013.01); *E04B 1/941* (2013.01); *E04D 5/10* (2013.01); *B32B 2262/0246* (2013.01); *B32B 2262/0276* (2013.01); *B32B 2262/04* (2013.01); *B32B 2262/10* (2013.01); *B32B 2262/101* (2013.01); *B32B 2262/106* (2013.01); *B32B 2307/54* (2013.01); *B32B 2307/718* (2013.01); *B32B 2307/732* (2013.01); *B32B 2419/06* (2013.01); *D06N 2201/0245* (2013.01); *D06N 2201/082* (2013.01); *D06N 2203/048* (2013.01); *D06N 2209/067* (2013.01); *D06N 2211/06* (2013.01); *E04D 5/148* (2013.01)

(58) Field of Classification Search
  CPC .... B32B 2262/0276; B32B 2262/0246; E04D 5/10; E04D 5/148; E04B 1/941
  USPC ...... 52/408, 411, 506.01, 782.1; 442/27, 35, 442/38, 41, 57, 286, 288, 394, 396
  See application file for complete search history.

(56) References Cited

U.S. PATENT DOCUMENTS

| | | | | |
|---|---|---|---|---|
| 4,666,761 A * | 5/1987 | Stamper | ................. | B32B 27/12 428/215 |
| 5,169,690 A | 12/1992 | Zimmerman et al. | ..... | 427/389.8 |
| 5,540,022 A * | 7/1996 | Morris | ................. | B05C 11/023 52/309.8 |
| 5,658,972 A * | 8/1997 | Grzybowski | ........... | C08L 95/00 106/18.26 |
| 6,864,195 B2 * | 3/2005 | Peng | ....................... | B32B 27/08 442/2 |
| 7,153,794 B2 | 12/2006 | Wenstrup et al. | ............. | 442/415 |
| 7,169,719 B2 * | 1/2007 | Mehta | .................... | B32B 27/12 442/2 |
| 7,229,938 B2 | 6/2007 | Wenstrup et al. | ............. | 442/415 |
| 7,341,963 B2 | 3/2008 | Wenstrup et al. | ............. | 442/415 |
| 7,446,065 B2 | 11/2008 | Wenstrup et al. | ............. | 442/415 |
| 7,454,817 B2 | 11/2008 | Wenstrup et al. | ............... | 19/302 |
| 7,521,386 B2 | 4/2009 | Wenstrup et al. | ............ | 442/389 |
| 7,709,405 B2 | 5/2010 | Wenstrup et al. | ............ | 442/415 |
| 8,206,817 B2 * | 6/2012 | Donovan | ................ | B32B 25/10 156/71 |
| 9,580,902 B2 | 2/2017 | Kalkanoglu et al. | | |
| 9,605,433 B2 | 3/2017 | Paradis et al. | | |
| 9,963,880 B2 | 5/2018 | Kraus et al. | | |
| 10,017,943 B1 * | 7/2018 | Zhou | .................... | C09D 175/04 |
| 10,155,693 B1 * | 12/2018 | Spreen | ................... | C04B 18/22 |
| 2004/0033741 A1 * | 2/2004 | Peng | ....................... | B32B 27/08 442/38 |
| 2005/0250399 A1 * | 11/2005 | Kuhn | ....................... | B32B 5/26 442/48 |
| 2005/0282449 A1 * | 12/2005 | Mehta | .................... | B32B 27/12 442/35 |
| 2006/0199453 A1 * | 9/2006 | Kuhn | ....................... | B32B 5/26 442/38 |
| 2007/0066176 A1 * | 3/2007 | Wenstrup | ............... | B32B 5/022 442/415 |
| 2008/0102243 A1 * | 5/2008 | Gupta | .................... | B32B 27/18 428/41.8 |
| 2012/0244340 A1 * | 9/2012 | Peng | ....................... | B32B 27/08 428/327 |
| 2013/0065470 A1 * | 3/2013 | Rock | ........................ | B32B 5/26 442/302 |
| 2014/0013693 A1 * | 1/2014 | Zhou | ....................... | B32B 5/16 52/408 |
| 2014/0062126 A1 * | 3/2014 | Weinberg | ............... | B29C 70/465 296/180.4 |
| 2014/0147642 A1 * | 5/2014 | Weinberg | ............... | B29C 70/465 428/212 |
| 2014/0230999 A1 * | 8/2014 | Weinberg | ............... | B29C 70/465 156/243 |
| 2014/0335750 A1 * | 11/2014 | Adams | .................... | B32B 5/022 442/57 |
| 2015/0224751 A1 * | 8/2015 | Oh | ........................... | B32B 27/12 442/398 |
| 2016/0023428 A1 * | 1/2016 | Adams | .................... | B32B 5/022 442/57 |
| 2016/0039176 A1 * | 2/2016 | Weinberg | ............... | B29C 70/465 296/191 |
| 2016/0069067 A1 * | 3/2016 | Ciuperca | ................ | E04B 1/625 52/309.8 |
| 2016/0237594 A1 * | 8/2016 | Rock | ........................ | B32B 5/26 |
| 2016/0312471 A1 * | 10/2016 | Hubbard | .................. | B32B 5/00 |
| 2017/0044770 A1 * | 2/2017 | Hubbard | .................. | E04D 5/06 |
| 2017/0210100 A1 | 7/2017 | Leatherman et al. | | |
| 2018/0023301 A1 * | 1/2018 | Wang | ..................... | B32B 27/08 428/424.8 |
| 2018/0094439 A1 * | 4/2018 | Wang | ..................... | B32B 27/08 |
| 2018/0257984 A1 * | 9/2018 | Spreen | ................... | C04B 18/22 |
| 2018/0305931 A1 * | 10/2018 | Zhou | .................... | C09D 175/04 |
| 2018/0362402 A1 * | 12/2018 | Spreen | ................... | C04B 18/22 |
| 2019/0003184 A1 * | 1/2019 | Wang | ..................... | B32B 13/042 |
| 2019/0003185 A1 * | 1/2019 | Wang | ..................... | B32B 13/042 |
| 2019/0127975 A1 * | 5/2019 | Spreen | ................... | C04B 18/22 |

* cited by examiner

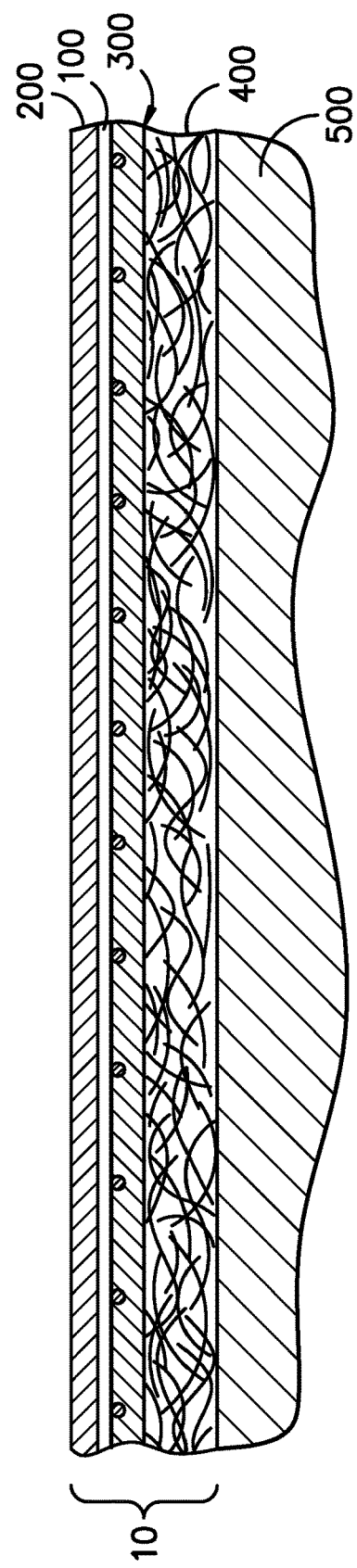

FIRE RESISTANT COMPOSITE ROOFING MEMBRANE

RELATED APPLICATIONS

This application claims priority to provisional patent application 62/583,775, filed on Nov. 9, 2017.

TECHNICAL FIELD

The present invention relates generally to roofing membranes, more particularly to roofing membranes containing a system of scrims and fleece to create a fire resistant composite roofing membrane.

BACKGROUND

Materials and construction methods for production of singly ply membrane roofing materials are varied but generally consist of a top ply and bottom ply thermoplastic membrane surrounding a structural scrim. Often used in "glue down" applications a needlefelt or fleece nonwoven is added to the backside of the bottom membrane to enhance the ability of the membrane composite to stick to the roof deck of the structure and provide a barrier between the glue and membrane. There is a need to have single ply roofing membrane that forms a char barrier often in wood decking flat roof structure during a fire event. Additionally, it has been discovered that adding additional non-charring FR materials significantly improves the FR performance of the composite.

BRIEF DESCRIPTION OF THE DRAWINGS

The present invention is best understood with reference to the following detailed description of embodiments of the invention when read in conjunction with the attached drawings, in which like numerals refer to like elements, and in which:

FIG. 1 is a cross-sectional illustration showing one embodiment of the composite roofing membrane.

DETAILED DESCRIPTION

The present invention generally relates to a composite roofing membrane whereby the scrim(s) and a uniquely blended fleece are used in tandem to generate a flame barrier incorporated into a composite roofing membrane for roofing applications. This composite roofing membrane, when applied to the roof deck of an architectural structure, is designed to form a 'char barrier' with some structural support. This resultant reinforced char is designed to withstand flame spread to the roof deck once the thermoplastic membrane has melted and/or burned away. The composite roofing membrane is designed to meet or exceed several FR testing protocols common in the roofing industry.

Referring now to FIG. 1, there is shown a cross-sectional illustration of one embodiment of the composite roofing membrane 10. The composite roofing membrane 10 contains a first scrim 100 sandwiched between a first membrane 200 and a second membrane 300. This tri layer structure 100, 200, 300 is often used as a single ply roofing membrane in mechanically adhered roofing systems and will referred to herein as a "single ply roofing membrane". This single ply roofing membrane can be attached to a fire resistant (FR) fleece 400 such that the second membrane 300 and the FR fleece 400 are adjacent. The composite roofing membrane 10 is attached to a roof 500 (or other structure) oriented such that the FR fleece 400 is adjacent the roof 500. Preferably, the single ply roofing membrane forms the outer surface of the composite roofing membrane 10. The thickness of the composite roofing membrane (including layers 100, 200, 300, 400) is between about 20 and 200 mils. Preferably, the areal weight of the composite roofing membrane 10 is between about 10 and 100 ounces per square yard.

The first scrim 100 has a first side and a second side. The first side of the first scrim 100 and the second side of the first membrane 200 are in intimate contact. The first scrim can be any suitable fabric including knit, woven, or non-woven and has a machine and cross-machine direction. The first scrim preferably has a thickness of between about 5 and 15 mils.

In one embodiment, the first scrim is a laid scrim where yarns (or fibers) are laid in the machine and cross machine direction and are attached together at their cross-over points. In FIG. 1, the first scrim is shown as a knitted weft inserted scrim so the dots are the machine direction yarns/fibers (the cross-machine yarns/fibers are not shown in the cross-sectional slice of the composite roofing membrane 10).

Typically, the scrim is designed in an open construction such that adhesion between the two membrane layers 200, 300 is possible while the scrim yarns can take the load of the roofing membrane without stretching, tearing, or other non-desired distortion of the single ply roofing membrane. Preferably, tensile strength of the first scrim 100 in the machine direction is at least about 100 N/cm$^2$. This allows installation of the roofing membrane from large rolls without significant distortion. Additionally, it improves the wind uplift performance of the roofing system.

The yarns/fibers making up the scrim 100 may be any suitable yarn or fiber. "Yarn", in this application, as used herein includes a monofilament elongated body, a multifilament elongated body, ribbon, strip, fiber, tape, and the like. The term yarn includes a plurality of any one or combination of the above. The yarns may be of any suitable form such as spun staple yarn, monofilament, or multifilament, single component, bi-component, or multi-component, and have any suitable cross-section shape such as circular, multi-lobal, square or rectangular (tape), and oval.

Some suitable materials for the yarns include aramid (including meta and para forms), polyester, polyolefin, nylon (including nylon 6, nylon 6,6, and nylon 4,6), steel, carbon, fiberglass, and polyethylene terephthalate (polyester or PET). In one preferred embodiment, the scrim 100 contains polyester yarns. In another preferred embodiment, the scrim 100 contains glass fibers.

The first membrane 200 has a first side and a second side and the first side of the first membrane preferably forms the upper surface of the composite roofing membrane 100. The second membrane 300 has a first side and a second side and the first side of the second membrane 300 and the second side of the first scrim 100 are in intimate contact.

The first and second membranes 200, 300 comprise a thermoplastic polymer which may be any suitable thermoplastic. Some common thermoplastics include ethylene propylene diene monomer M-class (EPDM) rubber, thermoplastic olefin (TPO), and polyvinyl chloride (PVC). Preferably, the first and second membranes 200, 300 are made from the same thermoplastic polymer. In one embodiment, the first and second membranes 200, 300 comprise polyvinyl chloride. In another embodiment, the first and second membranes 200, 300 comprise thermoplastic olefin. In another embodiment, the first and second membranes 200, 300 comprise EPDM rubber.

The single ply roofing membrane can be made either through extruding the first and second membrane 200, 300 around the first scrim 100, or by laminating two pre-extruded membranes 200, 300 together through the first scrim 100. Numerous variations where by extrusion and lamination can be combined in different methods are also commonly used.

The first membrane 200 preferably has a thickness (defined as the distance between the first and second side of the first membrane) of between about 10 and 60 mils. The second membrane 300 preferably has a thickness (defined as the distance between the first and second side of the second membrane) of between about 10 and 60 mils.

Adhesion between the two membranes is very important to insure proper performance in roofing applications, for example wind uplift is tested for all roofing membranes and ply to ply adhesion must be strong enough to withstand Pressures of at least about 60 psi, more preferably at least about 120 psi.

An open scrim construction is commonly employed to allow maximum adhesion between the two membrane layers. When practical adhesion of both layers in a similar time and space will allow compression of the two still softened membranes into one another through the scrim creating a strong stable composite. In virtually all known applications the top and bottom ply membranes are chosen from the same polymer to enhance adhesion between the two membranes. Differing amounts of additives are common differences between the top ply and bottom ply membrane. Often different colorants are used in the two plys. The top ply membrane will commonly be loaded with UV protective chemistries. The two layers may also require differing amounts of plasticizers or other features to enhance composite membrane performance.

Traditional application of the composite membrane structure to architectural roof decking is done with decking screws and washers, followed by overlapping of the next membrane layer to cover the screw and washer hardware from the weather. Recent advances in adhering roofing membranes to architectural roof decks has focused on using adhesives to fully adhere the entire membrane to the deck. single ply roofing membranes that are fully 'glued' down to the roof deck can often display significantly improved wind uplift results by eliminating pockets of non-adhered membrane from uplifting and causing stress on the mechanically adhered sections.

The bottom ply (second) membranes which preferably comprise thermoplastic polymers, tend to not lend themselves to good adhesion using commonly available adhesives especially solvent based adhesives. Often solvent based adhesives will dissolve the thermoplastic in question causing weak spots in the overall composite. Additionally, some water based adhesives can cause degradation and discoloration. Having a layer of fleece between the single ply roofing membrane (first and second membranes and first scrim) and the roof deck 500 can both protect the second membrane and enhance membrane to roof/deck adhesion.

Referring back to FIG. 1, a layer of FR fleece 400 is included in the composite roofing membrane facing the roof 500 to both protect the second membrane 400 and to enhance membrane to roof/deck adhesion. The first side of the FR fleece 400 and the second side of the first/second membrane 200, 300 are in intimate contact and the second side of the FR fleece 400 forms the lower surface of the composite roofing membrane 10. The second side of the FR fleece 400 faces the roof deck 500. In one embodiment, the second membrane 300 and the FR fleece 400 are attached together by an adhesive. They may also be attached together without needing an additional adhesive or may be attached using other attachment methods. Preferably, the fleece 400 is adhered to the second membrane 300 soon after extrusion of the second membrane 300 using heat and pressure.

Common in the industry are polyester (PET) and polypropylene (PP) felts in the basis weight range of 3-10 ounces per square yard (osy). These felts are typically needled to a thickness of between 4 and 200 mils to provide both an adhesion component and protective component to the single ply roofing membrane. Preferably the thickness of the FR fleece is between about 20 and 200 mils. High fleece density can improve protection of the bottom ply membrane against a corrosive adhesive; however, loft of the fleece can also enhance performance during impact events such as hail. Non-FR fleeces typically do not enhance the fire resistance or char integrity of a composite roofing membrane.

The FR fleece 400 is constructed to give the protections to the single ply roofing membrane described above and to impart FR characteristics to the composite membrane (10). Specifically, the FR fleece is designed to create a structurally stable char barrier which once formed will protect the architectural deck from a fire event.

The FR fleece preferably contains a plurality of non-FR fibers, a plurality of FR fibers, and a plurality of char scaffold fibers. In one embodiment, the FR fleece 400 comprises between about between about 30 and 70% by weight FR rayon staple fibers, between about 20 and 50% by weight FR stable scaffold fibers, and between about 20 and 50% by weight non-FR (typically polyester with no FR additives) fibers.

The non-FR fibers may be any suitable fiber and are included for loft and bulking of the fleece. Non-FR fibers tend to be less expensive than FR fibers so it is advantageous from a cost standpoint to be able to include a percentage of non-FR fibers in the FR fleece 400. These non-FR fibers provide volume in the z direction of the nonwoven material. Types of bulking fibers would include fibers with high denier per filament (5 denier per filament or larger), high crimp fibers, hollow-fill fibers, and the like. These fibers provide mass and volume to the material. Examples of fibers used as bulking fibers include polyester, and polypropylene, as well as other low cost fibers. In one embodiment, the non-FR fibers are thermoplastic fibers, preferably polyester fibers. Preferably, the polyester fibers are crimped to maximize the amount of loft from the fibers. In one embodiment, the percentage by weight of non-FR fibers in the FR fleece is between about 20 and 80%, more preferably between about 25 and 65, more preferably between about 25 and 45%.

The FR fleece also contains an FR fiber, which is defined to be fibers having a Limiting Oxygen Index (LOI) value of 20.95 or greater, as determined by ISO 4589-1. The FR fiber may be, for example, FR chemically treated fibers and inherently FR fibers. Preferably, the FR fibers are FR rayon staple fibers. In one embodiment, the percentage by weight of FR fibers in the FR fleece is between about 20 and 80%, more preferably between about 25 and 65, more preferably between about 25 and 45%.

The FR fleece also preferably includes a plurality of char scaffold fibers. Char scaffold fibers are defined to be fibers that once burned, retain a portion (at least about 80%) of their original strength. These fibers give strength to the fleece after it is burned. The char scaffold fibers may be mineral fibers such as silica and basalt, aramids, carbon fibers including partially oxidized polyacrylonitrile (PAN) and fully carbonized carbon, rayon both inherently FR including with modified cores and chemically treated FR rayon, natural fibers such as wool, and chemically treated synthetic fibers. Preferably, the char scaffold fibers are partially oxidized acrylonitrile (also sometimes referred to as PANOX) staple fibers or silica staple fibers. In one embodiment, the char scaffold fibers are partially oxidized acrylonitrile staple fibers. In another embodiment, the char scaffold fibers are silica staple fibers. Preferably, the FR fibers and char scaffold fibers are different fibers (made from different materials). In one embodiment, the percentage by weight of non-FR fibers in the FR fleece is between about 20 and 80%, more preferably between about 25 and 65, more preferably between about 25 and 45%.

In a further preferred embodiment, a 50/50 mixture by weight of partially oxidized acrylonitrile fabrics and mineral fibers provided a surprising FR improvement in performance due to increased char strength.

Often the char scaffold fibers employed are more brittle and contain significantly less crimp than more traditional fibers used in these applications. For these reasons, numerous enhancements are encouraged including elliptical needling, and proper blending of the fibers in terms of both type and denier to allow proper web formation and carriage through the carding process. Additionally, appropriate web weight and number of crosslaps becomes extremely important when dispersing fibers such as silica and basalt to impart a scaffolding to the char barrier formation.

The fibers in the FR fleece are typically blended to create a uniform fiber blend but when certain performance characteristics are desired can be stratified and or layered. Additionally, the FR fleece may have additional treatments added to it after batt formation including intumescent chemistries and the like.

Additionally, the FR fleece may have a second scrim within the fleece. Preferably, the second scrim can be made from the same materials (preferably glass fibers), same constructions, and same methods as those described in relation to the first scrim. This second scrim provides additional integrity to the FR fleece both before and after a fire event. The second scrim is preferably incorporated into the fleece, preferably needle-punched with the fabric to create the nonwoven fleece.

In one embodiment, after the composite roofing membrane 10 is burned, the first and second membranes 200, 300 at least partially melt or degrade and the fibers from the first scrim embed into the fibers of the FR fleece. It was discovered that this helped to impart superior performance to the final FR performance of the composite roofing membrane 10. Utilization of a glass fiber first scrim was found to impart the highest performance when combined with the scaffolding char barrier formation within the FR fleece. As the bottom membrane layer was consumed the first scrim imbeds itself into the scaffolding imparting an additional cross layer of support.

EXAMPLES

Example 1

A single ply roofing membrane was combined with a fleece to form the composite of example 1. The single ply roofing membrane had two membranes of PVC (20 mils and 30 mils) that had been extruded onto a 9×9 weft inserted 1000 denier polyester scrim.

The fleece was a non-fire resistant fleece formed using a carded, cross-lapped, and needle punched non-woven process. The fleece had an areal weight of 6.5 osy and was made using 85% by weight standard PET 3 denier 3" staple length and 15% by weight low melt PET 6 denier 3" staple length.

The fleece and the single ply roofing membrane were attached using heat and pressure (there were no additional adhesives used between the single ply roofing membrane and the fleece) to make the example 1 composite.

The composite was FR tested according to UL (790) which tests the composite on a wood-decking like structure. Example 1 failed UL (790).

Example 2

Example 2 was the same as example 1, except that the fleece was an FR fleece. The FR fleece was formed using a carded, cross-lapped, and needle punched non-woven process. The fleece had an areal weight of 8 osy and was made using 33% by weight standard PET 3 denier 3" staple length, 33% by weight FR rayon 4 denier 2" staple length, 17% by weight partially oxidized PAN 2 denier 2" staple length, 17% by weight silica fiber 1.5 denier 2" staple length. When the composite of example 2 was FR tested according to UL (790), it passed.

Example 3

Example 3 was the same as example 1, except that the fleece was an FR fleece reinforced with scrim. The reinforcing scrim was a 9×10 weft inserted 600 denier fiberglass scrim. The FR fleece with scrim was formed by carding, cross-lapping staple fibers, laying the reinforcing scrim on top, and then needle punching the fibers and scrim together. The fleece was 8 osy, the scrim was 1.75 osy and the fleece with the scrim was 9.75 osy. The fleece fibers were 33% by weight standard PET 3 denier 3" staple length, 33% by weight FR rayon 4 denier 2" staple length, 17% by weight partially oxidized PAN 2 denier 2" staple length, 17% by weight silica fiber 1.5 denier 2" staple length. When the composite of example 3 was FR tested according to UL (790), it passed at a higher level than example 2.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A composite roofing membrane having an upper surface and a lower surface comprising, in order:
    a first membrane having a first side and a second side, wherein the first side of the first membrane forms the upper surface of the composite roofing membrane, wherein the first membrane comprises a thermoplastic polymer;
    a first scrim having a first side and a second side, wherein the first side of the first scrim and the second side of the first membrane are in intimate contact, wherein the first scrim has a machine and cross-machine direction and comprises a yarn or fiber selected from the group consisting of polyester and glass, wherein the first scrim has a construction selected from the group consisting of a knit, woven, or non-woven, and wherein the tensile strength of the first scrim in the machine direction is at least about 100 N/cm$^2$;
    a second membrane having a first side and a second side, wherein the first side of the second membrane and the second side of the first scrim are in intimate contact, wherein the second membrane comprises a thermoplastic polymer; and,
    a fire resistant (FR) fleece having a first side and a second side, wherein the first side of the FR fleece and the second side of the second membrane are in intimate contact, wherein the second side of the FR fleece forms the lower surface of the composite roofing membrane, wherein the FR fleece comprises a plurality of FR rayon staple fibers and a plurality of char scaffold fibers selected from the group consisting of partially oxidized acrylonitrile and silica staple fibers.

2. The composite roofing membrane of claim 1, wherein the thermoplastic polymers in the first membrane and the second membrane are the same thermoplastic polymer.

3. The composite roofing membrane of claim 2, wherein the thermoplastic polymer of the first and second membranes comprises polyvinyl chloride.

4. The composite roofing membrane of claim 1, wherein the FR fleece comprises partially oxidized acrylonitrile fibers.

5. The composite roofing membrane of claim 1, wherein the FR fleece comprises silica fibers.

6. The composite roofing membrane of claim 1, wherein in the event of a fire, the first and second membrane at least partially melt or degrade and the fibers of the first scrim embed into the fibers of the FR fleece.

7. The composite roofing membrane of claim 1, wherein the first membrane and second membrane are extruded onto the first scrim.

8. The composite roofing membrane of claim 1, wherein the FR fleece further comprises a second scrim embedded into the fleece.

9. The composite roofing membrane of claim 1, wherein the FR fleece has a thickness defined as the distance between the first and second side of the FR fleece of between about 20 and 200 mils.

10. The composite roofing membrane of claim 1, wherein the FR fleece comprises between about between about 30 and 70% by weight FR rayon staple fibers, between about 20 and 50% by weight scaffold fibers, and between about 20 and 50% by weight polyester fibers.

11. The composite roofing membrane of claim 1, wherein the second membrane and the FR fleece are attached together with an adhesive.

12. The composite roofing membrane of claim 1, wherein the composite roofing membrane has an areal weight of between about 10 and 100 ounces per square yard.

13. A roof comprising a roof deck and the composite roofing membrane of claim 1 adhered to the roof deck, wherein the composite roofing membrane is oriented such that the lower surface of the composite roofing membrane faces the roof deck.

14. A composite roofing membrane having an upper surface and a lower surface comprising, in order:
    a first membrane having a first side and a second side, wherein the first side of the first membrane forms the upper surface of the composite roofing membrane, wherein the first membrane comprises a thermoplastic polymer;
    a first scrim having a first side and a second side, wherein the first side of the first scrim and the second side of the first membrane are in intimate contact, wherein the first scrim has a machine and cross-machine direction and comprises a yarn or fiber selected from the group consisting of polyester and glass, wherein the first scrim has a construction selected from the group consisting of a knit, woven, or non-woven, and wherein the tensile strength of the first scrim in the machine direction is at least about 100 N/cm$^2$;
    a second membrane having a first side and a second side, wherein the first side of the second membrane and the second side of the first scrim are in intimate contact, wherein the second membrane comprises a thermoplastic polymer; and,
    a fire resistant (FR) fleece having a first side and a second side, wherein the first side of the FR fleece and the second side of the second membrane are in intimate contact, wherein the second side of the FR fleece forms the lower surface of the composite roofing membrane, wherein the FR fleece comprises a plurality of FR rayon staple fibers and a plurality of char scaffold fibers selected from the group consisting of partially oxidized acrylonitrile and silica staple fibers, wherein the FR fleece further comprises a second scrim embedded into the fleece, wherein the second scrim has a machine and cross-machine direction and comprises a plurality of glass fibers, wherein the second scrim has a construction selected from the group consisting of a knit, woven, or non-woven, and wherein the tensile strength of the second scrim in the machine direction is at least about 100 N/cm$^2$.

15. The composite roofing membrane of claim 14, wherein the thermoplastic polymer of the first and second membranes comprises polyvinyl chloride.

16. The composite roofing membrane of claim 14, wherein the FR fleece comprises partially oxidized acrylonitrile fibers.

17. The composite roofing membrane of claim 14, wherein in the event of a fire, the first and second membrane at least partially melt or degrade and the fibers of the first scrim embed into the fibers of the FR fleece.

18. The composite roofing membrane of claim 14, wherein the FR fleece comprises between about between about 30 and 70% by weight FR rayon staple fibers, between about 20 and 50% by weight scaffold fibers, and between about 20 and 50% by weight polyester fibers.

19. The composite roofing membrane of claim 14, wherein the second membrane and the FR fleece are attached together with an adhesive.

20. A roof comprising a roof deck and the composite roofing membrane of claim 14 adhered to the roof deck, wherein the composite roofing membrane is oriented such that the lower surface of the composite roofing membrane faces the roof deck.

\* \* \* \* \*

UNITED STATES PATENT AND TRADEMARK OFFICE
CERTIFICATE OF CORRECTION

PATENT NO. : 10,443,190 B2  
APPLICATION NO. : 16/178114  
DATED : October 15, 2019  
INVENTOR(S) : David E. Wenstrup Page 1 of 1

It is certified that error appears in the above-identified patent and that said Letters Patent is hereby corrected as shown below:

On the Title Page

Item (72) delete "NC" and replace with SC.

Signed and Sealed this  
Twelfth Day of May, 2020

Andrei Iancu  
*Director of the United States Patent and Trademark Office*